United States Patent Office 3,395,002
Patented July 30, 1968

3,395,002
INSTANT IGNITING CHARCOAL
Henry S. Winnicki, New Canaan, Conn., and Jerry M. Kreinik, Parkersburg, W. Va., assignors to FMC Corporation, New York, N.Y., a corporation of Delaware
No Drawing. Filed Nov. 2, 1966, Ser. No. 591,422
4 Claims. (Cl. 44—6)

ABSTRACT OF THE DISCLOSURE

A method of making instant igniting charcoal which comprises impregnating charcoal with at least 20% by weight of a solution of 1–5% by weight nitrocellulose dissolved in a lower aliphatic alcohol, preferably methanol, ethanol, propanol or isopropanol. The impregnated charcoal is immersed in water to gel the nitrocellulose alcohol solution in the charcoal. The charcoal is then either packaged in a vapor-proof container or coated with a flammable polymer coating. A preferred gellation method is to immerse the impregnated charcoal in a solution of polyvinyl alcohol in water to gel the impregnant. The impregnated charcoal is then dried to form a polyvinyl alcohol coating on the impregnated charcoal.

---

This invention relates to instant-igniting charcoal and more particularly to charcoal which is made instant-igniting by impregnating the charcoal with an alcohol-polymer solution, thereafter gelling the solution by immersing the impregnated charcoal in water and finally coating the charcoal with a flammable coating.

A commonly used method of igniting charcoal is to saturate the charcoal with a solvent such as benzene, kerosene, methyl alcohol, and the like, and ignite the solvent-saturated charcoal. This method of igniting charcoal is rather dangerous as the solvent can flash and flame-up upon ignition.

It is desirable to produce instant-igniting charcoal which may be ignited with a flame or other igniting method or device, which is clean handling, ignites easily, and after ignition does not emit objectionable smoke and odors. It has been suggested that briquettes composed of charcoal and citrus hulls, and charcoal briquettes containing oxidizable compounds such as potassium nitrite and coated with a cellulose lacquer, are easy to ignite. However, both of these types of charcoal briquettes emit such objectionable odorous smoke that they have not been acceptable to the using public.

Charcoal briquettes which are saturated with kerosene or benzene are available in plastic bags or other vapor-proof containers; however, the container must be kept tightly closed to retain the igniting fluid. These briquettes are wet and unpleasant to handle. Moreover, upon ignition these charcoal briquettes burn with the emission of odorous smoke so that they too have not proven commercially acceptable.

Charcoal molded in pulp paper board containers such as egg box type cartons, saturated with wax to promote easy ignition and combustion, are easily ignitable. Wax coated charcoal briquettes, also easily ignitable, are available. Upon ignition, these wax coated charcoal products produce a large amount of black smoke accompanied by most unpleasant odors which continue until the wax coating is burned away. Hence, these materials too have failed to obtain consumer acceptance.

One object of this invention is to prepare instant-igniting charcoal which after ignition burns without emitting objectionable odor and smoke.

Another object of this invention is to prepare instant-igniting charcoal which is dust-free and clean handling.

These and other objects will be apparent from the following disclosure.

We have discovered that charcoal can be made instant-igniting by impregnating the charcoal with an ignitor fluid composed primarily of a small amount of a selected polymer dissolved in an alcohol and then gelling the ignitor fluid in situ in the charcoal. Where dustless clean handling charcoal is desired the charcoal, after the ignitor has been applied and gelled, can be coated with a suitable, easily ignitable, polymer coating. This method of making instant-igniting charcoal is particularly suitable to convert charcoal briquettes which are notoriously difficult to ignite, into easily ignitable products.

The charcoal is first impregnated with an alcohol-polymer solution, such as small amount of nitrocellulose dissolved in ethyl alcohol. The impregnant in the charcoal is then gelled by placing the impregnated charcoal in water. The gelation serves to prevent the fluid from draining from the impregnated charcoal, and reduces the evaporation rate of the alcohol so that the gelled ignitor fluid burns slowly and uniformly, insuring a sufficiently long ignition period to get the charcoal to its own combustion temperature.

Coating the charcoal which contains a gelled impregnant with suitable flammable polymer coatings such as polyvinyl alcohol and cellulose acetate improves the storeablity of the impregnated charcoal and makes the charcoal clean handling.

Charcoal or charcoal briquettes can be impregnated with the impregnating solutions and by the method of this invention. Thus charcoal can be impregnated according to this invention and then formed into charcoal briquettes or other molded shapes.

The alcohols useful in practicing this invention are principally those aliphatic alcohols with a chain length of 1 to 3 carbon atoms. These alcohols burn cleanly without emitting odorous smoke. Ethyl alcohol is preferred because it is non-toxic.

Most of the commercially available alcohol soluble nitrocellulose compounds containing 10 to 14% nitrogen ordinarily used in lacquers are useful in preparing the gelled ignitor fluids of this invention. Nitrocellulose which is not soluble in alcohol may be used in these gelled ignitor fluids by replacing some of the alcohol with a small amount of ketone, such as acetone, which solubilizes the nitrocellulose. Nitrocellulose compounds which have solution viscosities of 30 to 200 seconds, determined according to ASTM Method D–301–56 are preferred as these compounds give the best gel formation. The charcoal is impregnated with an alcohol solution which contains about 1 to 5% nitrocellulose.

The impregnation may be done by soaking in an open tank for 10 to 30 minutes or in a closed tank in which pressure may be applied. The preferred impregnation technique is a vacuum-pressure technique in which the charcoal is placed in a vacuum tank which is evacuated for a period of about 30 minutes; impregnating solution is then drawn into the tank by vacuum to a level which covers the charcoal; the vacuum is then released and about 50–60 p.s.i. of air pressure is applied for a short period of time, generally about 2 minutes. The vacuum-pressure impregnation technique deeply impregnates the charcoal. After impregnation with the ignitor fluid the charcoal is then immersed in water to gel the nitrocellulose-alcohol solution in the charcoal.

The amount of ignitor fluid required to make charcoal instant igniting depends to some extent upon the surface area of the charcoal. Charcoal containing relatively large surface areas, such as loose charcoal and molded briquettes, and blocks which contain a plurality of holes require impregnation with only about 20% by weight of the gelled impregnant to make the charcoal self-igniting. Smooth surface charcoal such as briquettes and blocks containing no indentations or holes require impregnation with about 25% by weight of the ignitor fluid to produce satisfactory self-igniting briquettes and blocks.

The impregnated briquettes are coated with a flammable polymer coating after the ignitor fluid has been gelled. The coating is somewhat permeable to the alcohol, but holds the gelled alcohol in the charcoal well enough so it may be packaged in vapor proof containers. The impregnated coated charcoal can be stored for long periods of time in vapor proof containers and still ignite easily after storage.

Polymer selection is important as only those polymers which are film formers and which burn easily and without emitting odorous smoke are useful in practicing this invention. The polymer coating is generally done by immersing the impregnated charcoal in a 10 to 20% solution of the selected polymer after which the coated charcoal is dried to remove the solvent from the coating. The preferred polymer coatings are polyvinyl alcohol, cellulose acetate and nitrocellulose. Polyvinyl alcohol is preferred because it is possible to prepare a water solution of polyvinyl alcohol into which the impregnated charcoal may be immersed. The water present in the polyvinyl alcohol solution gels the impregnant in the charcoal and upon drying the polyvinyl alcohol forms a polymer coating on the charcoal. Subsequent cellulose acetate coatings improve the storageability of polyvinyl alcohol coated charcoal.

The following examples illustrating the novel products and methods disclosed herein for preparing instant igniting charcoal are given without any intention that the invention be limited thereto. All parts and percentages are by weight.

EXAMPLE 1

Impregnating solution:
Base mix #1:
    Ethyl alcohol (absolute) _____ 82.4
    Acetone _____ 9.37
    Nitrocellulose (30 sec.) _____ 8.23
                                              ──────
                                              100.00

Final mix #1:
    Base mix #1 _____ 43.38
    Ethyl alcohol (anhydrous) _____ 56.62
                                              ──────
                                              100.00

Ten charcoal briquettes weighing 248 grams were impregnated with 92 grams of final mix #1 by placing the briquettes in a vacuum chamber, evacuating the chamber for 30 minutes, drawing final mix #1 into the tank by vacuum until the briquettes were covered, releasing the vacuum and then applying 60 pounds per square inch of air pressure for 2 minutes. The impregnated briquettes were then placed in cold water to gel the ignitor fluid in the briquettes. The impregnated briquettes ignited immediately when touched with a flame, they burned well, with a flame-out time of about 6 minutes, and all edges of the briquettes ignited. These impregnated briquettes had to be stored in vapor-tight containers to retain their instant igniting property. Individual sealed metal foil containers are particularly useful with the uncoated impregnated charcoal.

EXAMPLE 2

Charcoal survival fuel blocks averaging 1.9 pounds in weight containing a plurality of half inch holes were impregnated with final mix #1 by placing the survival fuel blocks in a vacuum chamber, evacuating the chamber for 30 minutes, drawing final mix #1 into the tank by vacuum until the survival fuel blocks were covered, releasing the vacuum and then applying 60 p.s.i. of air pressure for 2 minutes. The impregnation resulted in a weight pick-up of 37%. The impregnated survival fuel blocks were placed in a 10% polyvinyl alcohol in cold water solution. Immersing the impregnated survival fuel blocks in the polyvinyl alcohol water solution gelled the ignitor fluid in the survival fuel block and upon drying the polyvinyl alcohol formed a coating on the surface of the impregnated fuel blocks. The survival fuel blocks were packaged in polyethylene bags. After storage these briquettes ignited immediately when touched with a flame and they burned well, being completely consumed within two and one half hours.

EXAMPLE 3

Ten charcoal briquettes weighing 250 grams were impregnated with 96 grams of final mix #1 from Example 1 by placing the briquettes in a vacuum chamber, evacuating the chamber for 30 minutes, drawing final mix #1 into the tank by vacuum until the briquettes were covered, releasing the vacuum and then applying 60 pounds per square inch of air pressure for 2 minutes. The impregnated briquettes were then placed in a polyvinyl alcohol water solution to gel the ignitor fluid in the briquettes and coat the briquettes with a polyvinyl alcohol coating. The briquettes were then dried and subsequently coated by immersing them in a 10% cellulose acetate in acetone solution after which they were dried. A second cellulose acetate coating was applied by dipping the briquettes in a 20% cellulose acetate in acetone solution and subsequently drying the briquettes. The coated briquettes were dustless and capable of being stored for an extended period of time in vapor proof containers. The briquettes ignited immediately when touched with a match, they burned well, with a flame-out time of 6 minutes, and all edges of the briquettes ignited.

This example was repeated several times using methyl and isopropyl alcohol to replace the ethyl alcohol in base mix #1 and final mix #1. These briquettes also ignited immediately when touched with a match, burned well, and all edges of the briquettes ignited.

EXAMPLE 4

Ten charcoal briquettes weighing 250 grams were impregnated with 96 grams of final mix #1 from Example 1 by placing the briquettes in a vacuum chamber, evacuating the chamber for 30 minutes, drawing final mix #1 into the tank by vacuum until the briquettes were covered, releasing the vacuum and then applying 60 p.s.i. of air pressure for a period of 2 minutes. The impregnated charcoal briquettes were then placed in a 10% polyvinyl alcohol in cold water solution. Immersing the impregnated briquettes in the polyvinyl alcohol water solution gelled the ignitor fluid in the briquettes and upon drying the polyvinyl alcohol formed a coating on the surface of the impregnated briquettes. The briquettes containing the polyvinyl alcohol coating were then coated twice with cellulose acetate; once by immersion in a 10% cellulose acetate acetone solution followed by drying and a second coating was applied by immersing the briquettes in a 20% cellulose acetate in acetone solution and again drying the briquettes. The coated briquettes were dustless and capable of being stored for an extended period of time in vapor-proof containers. These briquettes ignited immediately when touched with a flame they burned well with a flame-out time of 6 to 7 minutes, and all edges of the briquettes ignited.

EXAMPLE 5

Example 3 was repeated using alcohol soluble nitrocellulose and replacing the acetone used in Example 1 with 9.37 grams of absolute ethyl alcohol in preparing the impregnating fluid. The charcoal was impregnated and coated as in Example 1. The dried, coated briquettes were dustless, capable of being stored for extended periods of time in vapor-proof containers. They ignited immediately when touched with a flame and burned well, with a short flame-out period; all edges of the briquettes ignited.

EXAMPLE 6

Ten charcoal briquettes having a total weight of 320 grams were impregnated as in Example with final mix #1, during which impregnation the briquettes were impregnated with 136 grams of final mix #1. The briquettes were gelled as in Example 4 during which they picked up 34 grams of water which made a total weight pick-up of 34%. The briquettes were given 3 polymer coatings following the procedure of Example 4. These briquettes were dustless and ignited instantly upon being touched with a flame. The briquettes burned well with a flame-out period of about 10 minutes and all edges and corners of the briquettes ignited.

EXAMPLE 7

Ten charcoal briquettes having a total weight of about 320 grams were impregnated with a solution according to the procedure used in Example 3 with 152 grams of final mix #1 of Example 1. The briquettes were immersed in water to gel the ignitor fluid during which they picked up 38 grams of water for a total weight pick-up of 190 grams. The briquettes were coated as in Example 4. The briquettes were dustless and ignited immediately upon being touched with a match. The flame-out time was 12 minutes and all edges and corners of the briquettes ignited.

EXAMPLE 8

Ten charcoal briquettes having a total weight of about 270 grams were impregnated as in Example 3 with final mix #1 from Example 1 during which they picked up 72 grams of ignitor fluid. The briquettes were immersed in water to gel the ignitor fluid during which gellation they picked up 18 grams of water. The briquettes were coated as in Example 4. The briquettes were dustless and ignited immediately upon being touched with a flame. The briquettes burned well with a flame-out time of about 13 minutes, however, only a small part of the briquette averaging only one corner per briquette was ignited. The total weight percent pick-up of flammable impregnant in this example was about 21%.

This example was repeated in which the briquettes were impregnated with only about 17.5% by weight of the flammable ignitor fluid. The coated briquettes were dustless and ignited immediately upon being touched with a flame. The flame on the briquettes flickered and was not sustained; the briquettes were not ignited.

EXAMPLE 9

Charcoal briquettes containing quarter inch diameter holes were impregnated as in Example 7. The impregnated briquettes contained only about 21% by weight of flammable ignitor fluid. These briquettes ignited immediately upon being touched with a flame and burned well with a flame-out time of about 13 minutes. The briquettes were ignited uniformly, burned easily, and were completely consumed in 80 minutes.

EXAMPLE 10

Example 3 was repeated several times using different nitrocellulose modifications. Samples were prepared replacing the 30 second nitrocellulose in final mix #1 with various nitrocellulose samples including half second, 40 second, 125 second, 200 second and 400 second nitrocellulose. All of these modifications gave satisfactory, self-igniting briquettes. However, the 30, 40, 125 and 200 second nitrocellulose gave the best gel formations.

As will be apparent to those skilled in the art numerous modifications and variations of the processes and products illustrated above may be made without departing from the spirit of the invention and of the scope of the following claims.

What is claimed is:
1. A method of making instant igniting charcoal which comprises:
   (a) impregnating the charcoal with at least 20% by weight of a solution of nitrocellulose dissolved in a lower aliphatic alcohol selected from the group consisting of methanol, ethanol, propanol and isopropanol;
   (b) gelling the nitrocellulose-alcohol solution by immersing the impregnated charcoal in water;
   (c) removing the charcoal containing the gelled nitrocellulose-alcohol solution from the water; and
   (d) coating the impregnated charcoal with a flammable polymer coating selected from the group consisting of polyvinyl alcohol, cellulose acetate and nitrocellulose.
2. The instant igniting charcoal produced according to the method of claim 1.
3. A method of making instant igniting charcoal comprising:
   (a) placing charcoal in a vacuum pressure tank;
   (b) evacuating the tank for at least 10 minutes;
   (c) covering the charcoal, while under vacuum, with an impregnating solution of 1–5% by weight of nitrocellulose dissolved in an alcohol selected from the group consisting of methanol, ethanol, propanol and isopropanol;
   (d) releasing the vacuum;
   (e) applying at least 10 pounds per square inch of pressure on the contents of the tank for at least one minute;
   (f) immersing the impregnated charcoal in a 10% by weight solution of polyvinyl alcohol in water;
   (g) removing the charcoal from the polyvinyl alcohol solution;
   (h) drying the impregnated charcoal, thereby forming a polyvinyl alcohol coating on the impregnated charcoal.
4. The method of claim 3 further comprising coating the coated charcoal with additional coatings of a flammable polymer selected from the group consisting of poly(vinyl alcohol), cellulose acetate and nitrocellulose.

References Cited

UNITED STATES PATENTS

| | | | |
|---|---|---|---|
| 1,983,560 | 12/1934 | Palmer | 44—41 |
| 2,816,013 | 12/1957 | Powell | 44—41 XR |
| 2,996,431 | 8/1961 | Barry | 44—38 XR |
| 3,143,446 | 8/1964 | Berman. | |
| 3,271,120 | 9/1966 | Corey | 44—7 |

DANIEL E. WYMAN, *Primary Examiner.*

C. F. DEES, *Assistant Examiner.*